ent">United States Patent [11] 3,569,931

[72] Inventor Benjamin Baxter
 P.O. Box 448, Fowler, Calif. 93625
[21] Appl. No. 760,569
[22] Filed Sept. 18, 1968
[45] Patented Mar. 9, 1971

[54] AUTOMOTIVE VEHICLE ANTITHEFT SYSTEM
 9 Claims, 4 Drawing Figs.
[52] U.S. Cl. .................................................. 340/64,
 340/63
[51] Int. Cl. ..................................................... B60r 25/00,
 G08b 13/00
[50] Field of Search........................................... 340/63, 64

[56] References Cited
 UNITED STATES PATENTS
2,956,263 10/1960 Brown et al................... 340/64

3,194,970 7/1965 Claps............................ 340/64
Primary Examiner—John W. Caldwell
Assistant Examiner—Howard S. Cohen
Attorney—Huebner & Worrel ABSTRACT: An automotive antitheft system including an alarm and an electrical circuit having bistable switch means interconnected with an ignition circuit for internal combustion engines and including means for making a circuit to an alarm while breaking the ignition circuit, and to provide for the making of the ignition of a circuit while simultaneously breaking the circuit to the alarm so that upon closing the ignition circuit at the ignition switch only the alarm may be energized when the switching device is in a first bistable position and, alternatively, only the ignition circuit may be energized when the switch mechanism is in second bistable position.

Patented March 9, 1971

3,569,931

BENJAMIN BAXTER
INVENTOR

Huebner & Worrel
ATTORNEYS 3,569,931

1

AUTOMOTIVE VEHICLE ANTITHEFT SYSTEM

BACKGROUND OF THE INVENTION

The invention relates to antitheft systems for motor vehicles and more particularly to an electrical circuit and an alarm which serve to prevent unauthorized use of motor vehicles.

Normally, known antitheft devices include fuel shutoff mechanisms, circuit interrupters and various combinations of these two systems. Frequently, known systems employed for preventing unauthorized operation of motor vehicles include displayed switching panels as well as levers, pull knobs and the like located at clearly obvious locations within the vehicle's operator compartment. Furthermore, the systems presently employed tend to be deficient in that they are fully operative or, conversely, they are fully inoperative. That is to say, that with known devices and systems it has been found very difficult to accommodate authorized use of an equipped vehicle without disclosing to the authorized operator the presence of the antitheft circuit. This problem typically arises where an automobile owner delivers his car to a parking attendant. Another common failing of known systems is that no alarm is provided for alerting vehicle owners of attempts to acquire unauthorized possession of parked vehicles. This failing is particularly important where an automobile is to be parked overnight on a residential street.

SUMMARY OF THE INVENTION

This invention overcomes the aforementioned difficulties through the use of a simplified series connected bistable, double-pole switch adapted to be interposed in a vehicle ignition circuit and connected with an audible warning device so that when the ignition circuit is closed at the switch an audible warning alarm is sounded, unless the bistable switch has been properly actuated.

An object of the invention is to provide an improved simple, efficient and economic antitheft system for signaling unauthorized operation of motor vehicles.

Another object of the invention is to provide a simplified warning mechanism for warning authorized vehicle operators of attempts by unauthorized operators to acquire possession of the vehicle.

Another object is to provide circuit means for effectively preventing "hot wiring" between the battery and the coil of ignition systems provided for motor vehicles.

Another object is to provide a lockable simplified and economic antitheft circuit to be employed for effectively impeding unauthorized use of motor vehicles and which may be rendered totally inoperative to avoid operative effects of the circuit.

These together with other objects and advantages will become more readily apparent by reference to the following description in light of the accompanying drawing.

DESCRIPTION OF THE INVENTION

Figure 1:
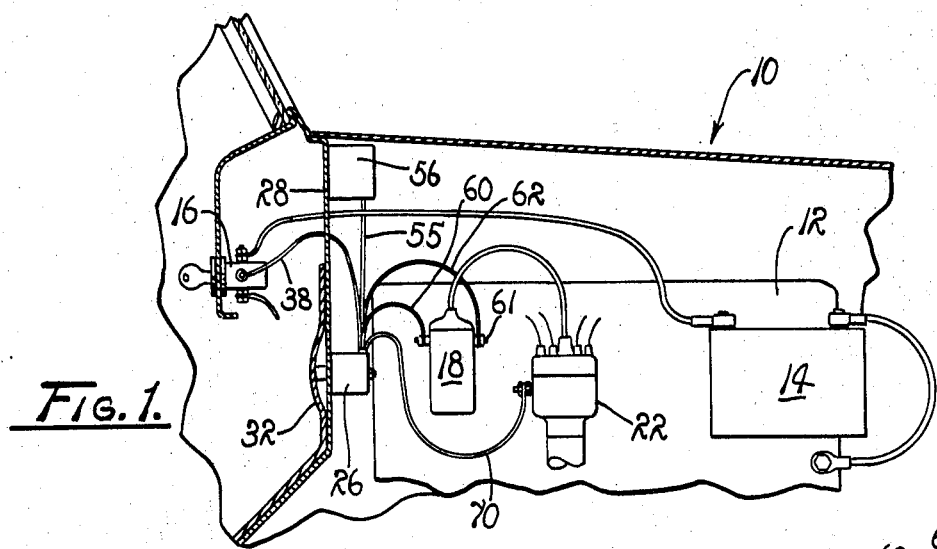
FIG. 1 is a fragmentary view of an automotive vehicle of a type including an electrical ignition circuit and the antitheft system embodying the principles of the instant invention.

As illustrated in FIG. 1, a motor vehicle 10 is provided with an internal combustion engine 12. Internal combustion engines normally are provided with an ignition circuit for initiating combustion of an atomized fuel supplied thereto by a fuel supply system. As is common practice, the electrical energy normally is provided by a suitable voltage source, such as a suitable battery 14. A current flow is achieved from the source 14 through an ignition switch 16 connected to an ignition coil 18 connected in series with suitable breaker points 20. The points 20 function in a known manner to achieve the desired pulses of DC (direct current) energy for achieving the arcing required to effect combustion of atomized fuel within the engine.

A proper functioning of the points 20 normally is achieved only after the ignition switch 16 has been closed utilizing a suitable ignition key so as to close the circuit between the current source or battery 14 and the points. Normally, the points are located in a distributor housing 22, however, if desired, they can be located at some other position relative to the coil 18.

The system embodying the principles of the present invention is coupled to the existing ignition circuit through circuit means including an additional switch 24. The switch 24 is a bistable, double-pole switch disposed in a housing 26 fixed to the vehicle's fire wall 28 by any suitable means, such as threaded studs 30. While the housing 26 is, as a matter of convenience, mounted on the fire wall 28, it is to be understood that it could be mounted in any other convenient location within the operator's compartment. However, an advantage realized by locating the switch on the fire wall is that the switch is readily available and may be operated by an authorized vehicle operator, while it remains obscured from the operator's view due to the vehicle's floormat 32 which serves as a readily available cover for concealing the device.

Figure 2:
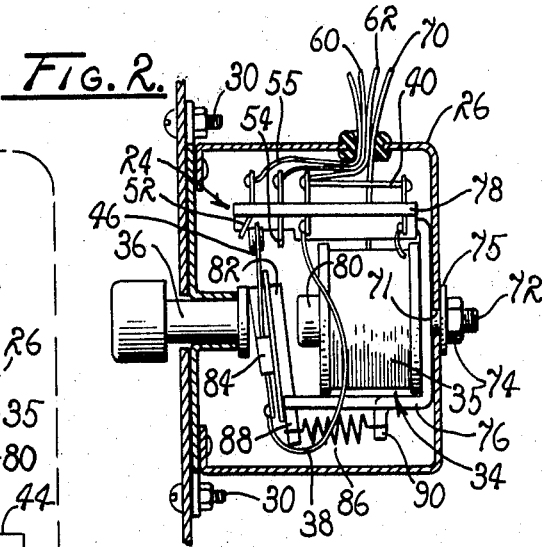
FIG. 2 is a partially sectioned elevation of the housing for the switch employed by the antitheft system illustrated in FIG. 1.

As illustrated in FIG. 2, a mechanical linkage is provided for actuating the switch 24 from a position within the operator's compartment. This linkage includes an electromagnet 34 provided with energizable windings 35 and a manually depressable switch actuating plunger 36, which together cooperate to actuate the switch 24 so that it may be displaced and be retained in either of its bistable positions.

Figure 3:
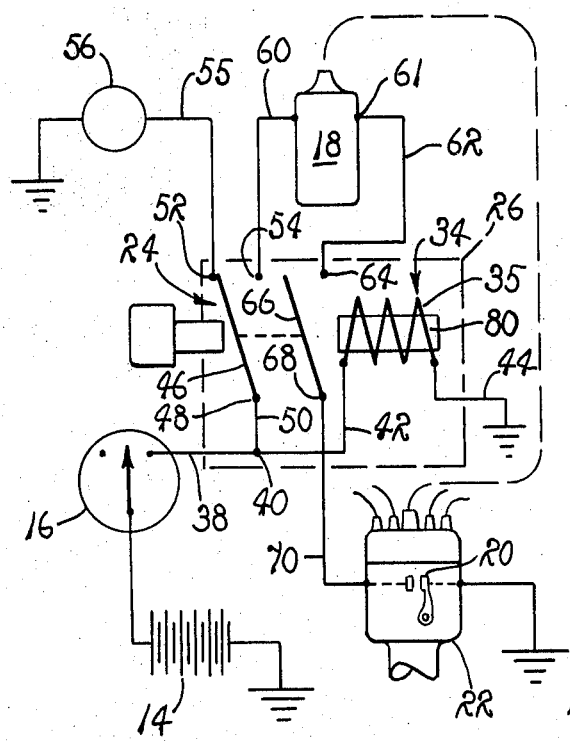
FIG. 3 is a diagrammatic view of the electrical ignition system including the antitheft circuit illustrated in FIGS. 1 and 2.

The switch 24 is connected at an input terminal 40, through an ignition lead 38, FIG. 3, extending from the ignition switch 16. The windings of the magnet 34 are connected with the input terminal 40 through a suitable lead 42 and to ground through an additional lead 44, whereby a circuit may be completed through the windings 35 of the magnet 34 from the battery 14 to ground as the ignition circuit is closed at the switch 16 for closing the circuit from the battery 14 to the input terminal 40.

As is readily apparent from an examination of the drawing, the circuit from the switch 16 to the coil 18 can only be made through the switch 24. Such is achieved through a pivoted contact bridging element 46 connected at its pivoted end to a contact 48. The contact 48 is, in turn, connected to the input terminal 40 by an input lead 50. Near the opposite end of the bridging element 46, a pair of spaced contacts 52 and 54 is disposed along an arc operatively described by the displacement of the bridging element 46. These contacts serve as mechanical stops and define the extent of pivotal displacement for the element 46. Consequently, when the element 46 is pivoted or operatively displaced, it is caused to engage one or the other of the contacts, that is, either of the contacts 52 or 54 thus to establish one or the other of the bistable positions for the switch.

As illustrated, the contact 52 is connected in circuit series through a suitable lead 55 to an electrically energizable audible warning device 56. The device 56 is of any suitable type which may be electrically energized and thus activated employing either a 6 or a 12 volt automobile power source. Such devices are commercially available and include such mechanism as bells, buzzers, "beepers," horns and the like. The specific type of warning system employed is not deemed critical so long as the chosen mechanism will perform the function of audibly or otherwise advising the authorized possessor of the vehicle of an unauthorized energization of the ignition circuit. Of course, visual warning devices can be coupled with the circuit for similar purposes.

The coil 18 is connected with the switch contact 54 through a suitable electrical lead 60. This lead connects the coil 18 in series with the switch 24, and consequently, in circuit series with the ignition switch 16 and battery 14. The opposite side of the coil 18 is connected at its terminal 61 to lead 62, which serves for connecting the coil to a switch contact 64, as is additionally provided for the switch 24. The contact 64 is alternately engaged by a contact of a bridging element 66 pivotally connected to a switch terminal 68, in a manner similar to the manner in which the bridging element 46 is pivotally connected within the switch. The circuit is normally open between these contacts to preclude "hot wiring" between the battery 14 and coil 18. A terminal 68 serves to connect the bridging element 66 with a lead 70. This lead is connected to the points 20 so that the bridging element is caused to be connected in series between the coil 18 and the breaker points 22.

If desired, a third bridging element could be provided for bridging contacts within the safety circuit of the manual shifting lever, as normally provided in automobiles having automatic transmissions, as a further safeguard against unauthorized use.

Turning back to FIG. 2, it will be noted that the housing 26 includes an additional opening 71 through which is extended a mounting stud 72. The stud 72 is screw threaded to receive a nut 74 and a suitable washer 75 for supporting the switch 24 and magnet 34 within the housing 26 in a manner which accommodates an intended actuation of the switch.

The magnet 34 and the bridging elements 46 and 66 of the switch 24 are coupled together in a well-known manner through the use of a mounting bracket means 76. In practice, the stud 72 is extended from a bracket 76 in order to support the switch and magnet in adjacent alignment and in a cooperative relationship within the housing 26. The switch terminals are supported on a terminal board 78, of known design, supported in an operative relationship relative to the bridging elements by the bracket 76.

In practice, once the switch 16 is closed, a direct current will be directed through leads 38 and 40 and applied to energize the windings 35. This energization establishes the required electromagnetic field commonly provided by magnets of the type herein employed. A suitable ferromagnetic core 80 is provided within the windings and serves to establish a flux field in the well understood manner once the windings 35 have been energized. In order to utilize the field established by the windings 35 and the core 80, the switch 24 is provided with a pivotally supported actuator 82 formed of a suitable ferromagnetic material. This actuator also is coupled to the bracket 76 and is operatively pivoted in response to the field established by the core 80 once the windings 35 of the magnet 34 have been energized for effecting a pivoting of the bridging elements mounted thereon.

The mounting of elements 46 and 66 on the actuator 82 is achieved through the use of a plate 84 which is formed of any suitable material and mounted on the actuator 82 in any suitable manner which prevents a shorting of the circuit. A tension spring 86 is fixed at one end thereof to the actuator 82, by a connector 88, and is connected at its other end to the bracket 76 by a simple connector 90. Therefore, the actuator 82 is biased in a first direction while being afforded pivotal displacement in a second direction so that the elements 46 and 66 may be displaced between either of the switch's bistable positions.

Therefore, it will be appreciated that the actuator 82 is mounted for pivotal displacement relative to the support bracket 76 for pivotally displacing the bridging elements 46 and 66 between the pairs of contacts for thus achieving the required bistable actuation for the switch. In order manually to displace the actuator 82, and consequently the bridging elements of switch 24, the plunger 36 is manually depressed so as to engage and force the actuator 82 toward the core 80 in opposition to the biasing of the spring element 86. It should be clearly understood that the distance between the actuator 82 and the core 80 normally is such that an energization of the windings 35 will not displace the actuator 82 towards the coil against the bias of the spring 86. However, it should also clearly be understood that once the actuator 82 has been moved into engagement with the core 80, the established field of the core is sufficient to retain the actuator thereagainst so as to hold the switch in one of its bistable conditions. Hence, the switch 24 assumes and is retained in a first bistable condition under the influence of the spring 86, and, subsequently, is switched to a second bistable condition through a depressing manipulation of the plunger 36 whereby the actuator 82 is displaced to a position wherein it will be retained under the influence of the magnetic field established through the core 80 until such time as the current through the windings 35 are interrupted.

Figure 4:
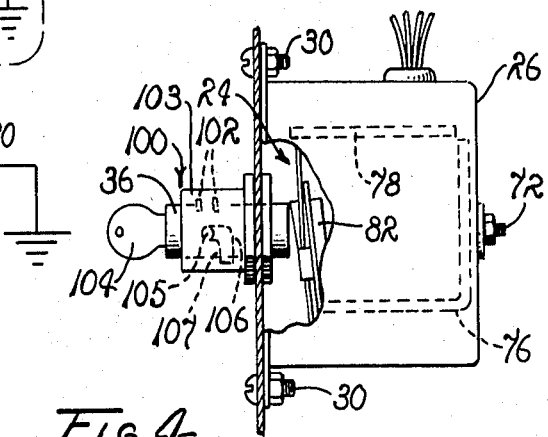
FIG. 4 is a partially sectioned view of the switch employed in the antitheft system illustrating a switch locking device including a tumbler and key mechanism connected therewith.

Turning now to FIG. 4, there is shown a locking mechanism, generally designated 100. Such mechanisms may be employed where required to protect the plunger 36 from unauthorized manipulation or where it is found desirable to lock the circuit in one or the other of its bistable conditions. The mechanism 100, in practice, includes a plurality of suitable tumblers 102 supported in a housing 103. The mechanism 100 can be actuated only by a properly configured key 104. Hence, where the mechanism 100 is employed, access to the plunger 36 can be achieved only through the locking mechanism 100. Consequently, the plunger 36 can be displaced toward the magnet 34 only after the mechanism 100 has been operatively unlocked through operative manipulation of the plungers. In this embodiment, the plunger 36 includes a laterally extended locking pin 105 mated with a slot 106 having formed therein a locking detent 107 extending along the circumference of the housing 103 so that the mechanism 100 only can be unlocked by employing an individually fitted key 104, and the plunger 36 only can be displaced subsequent to the unlocking operation. Displacement of the plunger 36 serves to displace the actuator 82 for the purpose and in the manner described. The plunger 36 is pivoted about its axis so as to force the pin 105 along the slot 106 into the locking detent 107 so arranged as to retain the plunger in its depressed attitude.

Through an employment of the mechanism 100, the switch 24 may be locked in either of its bistable conditions. In other words, the circuit may be locked in a manner such that the audible warning device 56 is connected through the switch 24 to the ignition switch 16 and locked in this condition through a simple manipulation of the plunger and the removal of the key 104 from the locking mechanism 100.

Conversely, the ignition circuit may be retained closed at the switch 24 while alarm system is rendered ineffective by first forcing the key 104 to unlock the lock mechanism 100 and then displacing the plunger 36 into engagement with the actuator 82, and subsequently pivoting the key to force the pin 105 into a seated position within the detent 107 of the slot 106. If desired, the key can be removed when the switch 24 is in its second bistable condition so that the ignition circuit from the ignition switch can be made in a normal manner through the switch 24 and through the coil 18 to the breaker points 20 without regard to the alarm system.

OPERATION

It is believed that the operation of the system is clearly apparent, however, it will be briefly reviewed at this point.

When the ignition circuit is open, no electrical energy is applied to the windings 35 of the magnet 34. Therefore the bridging element 46 is urged into engagement with the contact 52 under the bias of the tension spring 86. The contact 52 is, in turn, connected through the lead 55 to the audible warning device 56. Furthermore, the bridging element 66 has been so displaced as to open the ignition circuit between the coil 18 and the ignition circuit breaker points 20.

Therefore, when the circuit of the antitheft system is completed between the voltage source 14 and the alarm system or mechanism 56, through the closing of the ignition switch 16, by any means, the alarm is energized and the circuit remains completed to the alarm even though the windings of the magnet 34 have been electrically energized, due to the bias applied by the spring 86.

In order to inactivate the alarm 56, it is only necessary that the plunger 36 be depressed for displacing the actuator 82 into the electromagnetic field of the core 80. Since the windings of the magnet 34 have been energized by closing the switch 16, depressing the plunger 36 causes the actuator 82 to be brought into engagement, and then be retained in an engagement with the core 80. This displacement of the actuator serves pivotally to displace the bridging element 46 into engagement with contact 54 and the element 66 into engagement with contact 64. With the contacts 54 and 64 being engaged by the bridging elements 46 and 66, respectively, of the switch 24, a circuit is now completed from the voltage source 14 to the breaker points 20, through the ignition switch 16, bridging element 46, the coil 18 and the bridging element 66. With the circuit thus completed, the alarm system 56 is no longer capable of being energized, since the circuit has been opened by displacement of the element 46. The ignition circuit now may function in a normal manner to perform its intended purpose.

Where the locking mechanism 100 is employed, the plunger 36 can be depressed only through the operation of the key 104, which manipulates the locking tumblers of the lock 102, so that the plunger 36 can be depressed and the pin 105 seated in the detent 107 of the slot 106. The key 104 may, if desired, be withdrawn leaving the antitheft circuit in effect locked out. Hence, it can be appreciated that the alarm system may effectively be locked out of operation, so that the vehicle may be operated without employing the antitheft circuit. Furthermore, if the plunger 36 has been withdrawn so that the contact 52 has been engaged by the bridging element 46, the ignition circuit has, if effect, been locked open and the alarm system circuit locked closed, so that regardless of the manner in which a circuit is completed through the ignition switch 16, no circuit can be made through the ignition system and yet the circuit to the warning device 56 cannot be opened.

In view of the foregoing, it is to be understood that the invention embodied in the described system provides a practical system which may be readily installed on any vehicle having an ignition circuit and effectively serves to prevent theft or unauthorized use of the vehicle upon which the system has been mounted and incorporated.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:

1. A system for impeding unauthorized use of a vehicle of the type having an internal combustion engine equipped with an ignition circuit including therein a source of electrical energy, an actuatable ignition switch, an ignition coil, and breaker points comprising:
   a. means connecting a source of electrical energy with the ignition switch;
   b. an electrically energizable warning device; and
   c. a bistable switch mounted at a concealed location within the vehicle including:
      i. a first pivotally operable bridge element adapted to be displaced between a first and a second position for closing an electrical circuit between the ignition switch and the warning device, when in a first position, whereby the warning device is adapted to be energized in response to a circuit-closing actuation of said ignition switch, and for closing an electrical circuit between the ignition switch and the ignition coil, when in a second position, whereby the ignition coil is adapted to be energized in response to the circuit-closing actuation of the ignition switch;
      ii. a second pivotally operable bridge element adapted to be displaced between a first position and a second position for closing an electrical circuit between the ignition coil and the breaker points, when in a second position;
      iii. an electromagnetic device disposed adjacent to said first and second bridge elements having windings electrically coupled with the ignition switch adapted to be energized in response to a circuit-closing actuation of said ignition switch for establishing a flux field to develop a holding force sufficient for simultaneously maintaining the first and the second bridge elements in their second positions;
      iv. a spring coupled with said first and second bridge elements for continuously urging said bridge elements toward their first positions with a force sufficient to maintain said elements in their first positions, against the holding force of the established flux field; and
      v. a manually operable, reciprocating plunger operatively associated with said first and second bridge elements adapted to be depressed for simultaneously displacing the bridge elements from their first positions to their second positions.

2. In a circuit of the type including a source of electrical energy, an ignition switch, an ignition coil, and ignition circuit breaker points connected in series with the coil, the improvement comprising:
   a. an electrically energizable warning device;
   b. a first actuatable switch means interposed between the ignition switch and the ignition coil including means adapted to be actuated between the first and second switch position for alternately connecting the ignition switch with the warning device and with the ignition coil;
   c. second actuatable switch means connected between said coil and the breaker points adapted to be actuated between a first and a second switch position for alternately opening and closing the circuit between the coil and the breaker points; and
   d. switch actuating means connected with the first and the second actuatable switch means adapted to actuate the second switch means to the first switch position for opening the circuit between the coil and the points when the ignition switch is connected with the warning device, and to actuate the said second switch means to the second switch position for effecting a closing of the circuit between the coil and the points when the ignition switch is connected with the coil.

3. The system according the claim 2 wherein each actuatable means includes a pivotally supported bridge element.

4. The system of claim 3 wherein the switch actuating means comprises:
   a. means interconnecting the pivoted bridge elements;
   b. biasing means connected with the bridge elements adapted simultaneously to urge the bridge elements of the first and second switch means to the first switch position;
   c. manually actuatable switching means connected with the bridge elements adapted for manual actuation in a manner such that the bridge elements are displaced to a second switching position against the bias of said biasing means as the manually actuatable means is actuated; and
   d. electrical energizable means coupled with the bridge elements adapted operatively to retain the elements in the second position.

5. The system of claim 4 wherein the electrically energizable means includes an electrically energizable magnetic core adapted to establish a magnetic field having a flux density sufficient to retain the bridge elements in the second switching position against the bias of the biasing means while accommodating a retention of the bridge elements in the first switching position under the influence of the biasing means.

6. The system of claim 5 further comprising mechanical locking means connected with the switch and adapted to preclude actuation of said manually actuatable switching means.

7. The system of claim 6 wherein said locking means includes a mechanical locking device including a key-driven tumbler mechanism.

8. The system of claim 7 further comprising mounting means supporting the actuatable switch means in a selected vehicle at a point normally obscured from a vehicle operator.

9. The system of claim 8 wherein mounting means includes a support housing and screw-threaded studs for securing the switch means to the fire wall of the vehicle in a manner such that the actuatable switch means is extended through the fire wall.